Oct. 1, 1935.  L. B. BRABANT  2,015,918
GAS COCK OR THE LIKE
Filed Jan. 26, 1935
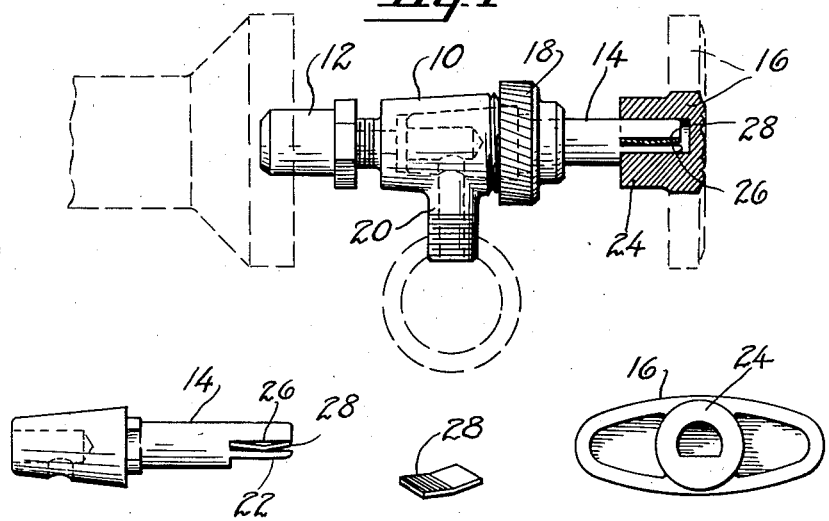
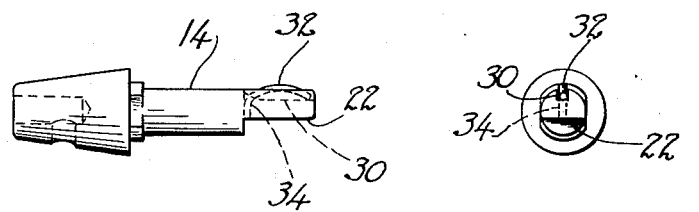
INVENTOR.
Leo B. Brabant
BY Parker & Burton
ATTORNEYS.

Patented Oct. 1, 1935

2,015,918

UNITED STATES PATENT OFFICE 2,015,918

GAS COCK OR THE LIKE

Leo B. Brabant, Detroit, Mich.

Application January 26, 1935, Serial No. 3,566

1 Claim. (Cl. 287—53)

My invention relates to improvements in gas cocks or the like and an object is to provide a gas cock or other similar devices with an improved simple, inexpensive, easily installed means for securing the manually operable handle to the rotatable plug member.

Heretofore such screws or other similar parts have been employed to secure the handle to the rotatable plug. These small parts are tedious to install within the relatively limited working space permitted and they frequently become detached and lost.

My improvement comprises a part which is entirely enclosed within the handle and protected thereby from separation from the handle. It functions to securely retain the handle on the plug. It is easily assembled and installed in position.

Other objects, advantages, and meritorious characteristics of my improvement will more sufficiently appear from the following specification, appended claim and accompanying drawing, wherein:

Figure 1 is an elevation partly shown in section of a gas cock embodying my invention, Fig. 2 is an elevation of the plug of the gas cock of Fig. 1, Fig. 3 is an elevation of the plug handle, Fig. 4 is a perspective of the steel spring retaining element, Fig. 5 is an elevation of a gas cock plug provided with a modified form of securing means, and Fig. 6 is an end elevation of the plug of Fig. 5.

In the drawing there is shown a gas cock having a body element 10 provided with a detachable hood 12 and a rotatable plug 14 provided with a handle 16. A cap 18 encircles the plug and is threadedly secured to one end of the body element. The body is provided with an inlet nipple 20 and is cored out as illustrated in dotted outline for the flow of gas or other fluid therethrough. The plug is cored out as illustrated in dotted outline to permit the flow of gas therethrough when the passageways are properly aligned for this purpose. This construction is in accordance with well-known practice. The plug is provided with a handle 16 which is secured to the end of the plug through the employment of my improved means.

The end of the plug is flattened on one side as at 22. The handle is provided with a hub 24 having a recess formed therein to receive the end of the plug and this recess is similarly flattened to correspond with the flattened face of the plug as illustrated particularly in Fig. 3. The end of the plug is provided with a kerf or slot 26 which extends lengthwise thereinto and a retaining element 28 in the form of a flat steel spring member is seated within this slot. This retaining element is yieldingly resistingly received within said slot as shown in Fig. 2 and is held under compression therein by engagement of the handle upon the end of the plug which constrains the spring member against its natural shape.

This retaining element may be normally shaped as shown in Figs. 3 and 4 so that when inserted within the kerf it is placed under tension and when the handle is received over such end of the plug, the spring is held yieldingly resistingly under compression as shown in Fig. 1 to exert expansible outward pressure against the split end of the plug urging the same against the wall of the recess within the handle to securely hold the handle upon the plug. The kerf is so formed as shown in the drawing, as to provide on one side a thin flexible lip adjacent to the flattened face of the plug which lip is yieldable to be urged against the opposite flattened face of the recess within the handle.

In the modification illustrated in Figs. 5 and 6 the round side of the plug at the handle end is provided with a lengthwise slot 30 within which is seated a steel spring 32 which is turned inwardly at 34 at one end into a recess in the plug to retain the same in place. This spring serves the same purpose as the spring described in connection with the description of the construction of Figs. 1 to 4 inclusive.

What I claim:

In a cock plug, a handle having a shank receiving recess D-shaped in cross section, a shank having an end portion D-shaped in cross section received within said recess, said D-shaped end of the shank provided with a kerf extending lengthwise thereinto in close proximity to a diameter thereof and parallel to the flat side of the D forming a thin flat flexible lip portion having parallel flat faces and arcuate edges, the arcuate edges of the lip portion being slightly closer together across its outer flat face than across the flat face of the lip portion within the kerf, a spring fitted within said kerf urging the outer flat face of the lip portion tightly against the flat face of the recess within the handle and urging the arcuate edges of said lip portion against the curved side walls of the recess within the handle adjacent to the flat face of said recess.

LEO B. BRABANT.